United States Patent
Bird et al.

(10) Patent No.: US 12,168,266 B2
(45) Date of Patent: Dec. 17, 2024

(54) METHODS OF MAKING A CUTTING ELEMENT FOR AN EARTH-BORING TOOL, METHODS OF REPROCESSING CUTTING ELEMENTS, AND ASSOCIATED CUTTING ELEMENTS

(71) Applicant: Baker Hughes Oilfield Operations LLC, Houston, TX (US)

(72) Inventors: Marc Bird, Houston, TX (US); John A. Bomidi, Spring, TX (US); Andrew Robertson, The Woodlands, TX (US); Nicholas J. Lyons, Houston, TX (US); Amir Rabani, London (GB); Paul Butler-Smith, Kent (GB); Jair Leal, Spring, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/048,916

(22) Filed: Oct. 24, 2022

(65) Prior Publication Data
US 2023/0126964 A1   Apr. 27, 2023

Related U.S. Application Data

(60) Provisional application No. 63/367,799, filed on Jul. 6, 2022.

(30) Foreign Application Priority Data

Oct. 26, 2021   (GB) .................................... 2115411

(51) Int. Cl.
| | |
|---|---|
| *E21B 10/567* | (2006.01) |
| *B23K 26/36* | (2014.01) |
| *B23K 101/00* | (2006.01) |

(52) U.S. Cl.
CPC ............ *B23K 26/36* (2013.01); *E21B 10/567* (2013.01); *B23K 2101/002* (2018.08)

(58) Field of Classification Search
CPC .. E21B 10/567; B23K 26/36; B23K 2101/002
See application file for complete search history.

(56) References Cited

U.S. PATENT DOCUMENTS

| | | | |
|---|---|---|---|
| 6,145,608 | A | 11/2000 | Lund et al. |
| 8,881,361 | B1 | 11/2014 | Gonzalez et al. |

(Continued)

FOREIGN PATENT DOCUMENTS

| | | |
|---|---|---|
| CN | 206200777 | 5/2017 |
| KR | 10-2254339 | 5/2021 |

OTHER PUBLICATIONS

International Search Report for International Application No. PCT/US2022/078732 dated Feb. 23, 2023, 3 pages.

(Continued)

*Primary Examiner* — Taras P Bemko
(74) *Attorney, Agent, or Firm* — Baker Hughes Company

(57) ABSTRACT

A method of making a cutting element for use on an earth-boring tool may include forming the cutting element including a cutting table formed from a superabrasive polycrystalline material. The method may further include polishing a cutting surface of the cutting table by pulsing a laser onto the cutting surface of the cutting table. The cutting element may include a superabrasive polycrystalline cutting table including a cutting surface substantially free of microanomalies in the superabrasive material.

18 Claims, 7 Drawing Sheets

(56) References Cited

U.S. PATENT DOCUMENTS

| | | | |
|---|---|---|---|
| 8,991,525 B2 | 3/2015 | Bilen et al. | |
| 9,149,901 B2 | 10/2015 | Shiroishi et al. | |
| 9,707,629 B2 | 7/2017 | Yano et al. | |
| 2009/0114628 A1 | 5/2009 | DiGiovanni | |
| 2015/0121960 A1* | 5/2015 | Hosseini | A44C 17/00 |
| | | | 65/29.11 |
| 2017/0037518 A1 | 2/2017 | Oxford et al. | |
| 2017/0254153 A1* | 9/2017 | Bird | B24D 18/0009 |
| 2019/0084087 A1 | 3/2019 | Chapman et al. | |
| 2020/0256133 A1* | 8/2020 | Slotnaes | F16C 33/043 |
| 2021/0047887 A1* | 2/2021 | Cao | E21B 10/567 |
| 2021/0340822 A1* | 11/2021 | Webb | E21B 10/573 |
| 2022/0241899 A1* | 8/2022 | Kim | B23K 26/36 |
| 2022/0389769 A1* | 12/2022 | Sauvageau | E21B 10/573 |

OTHER PUBLICATIONS

International Written Opinion for International Application No. PCT/US2022/078732 dated Feb. 23, 2023, 5 pages.

\* cited by examiner

METHODS OF MAKING A CUTTING ELEMENT FOR AN EARTH-BORING TOOL, METHODS OF REPROCESSING CUTTING ELEMENTS, AND ASSOCIATED CUTTING ELEMENTS

CROSS-REFERENCE TO RELATED APPLICATIONS

This application claims the benefit under 35 U.S.C. § 119(e) of U.S. Provisional Patent Application Ser. No. 63/367,799, filed Jul. 6, 2022, and United Kingdom Patent Application Serial No. GB2115411.7, filed Oct. 26, 2021, the disclosure of each of which is hereby incorporated herein in its entirety by this reference.

TECHNICAL FIELD

Embodiments of the present disclosure generally relate to cutting elements for earth-boring tools. In particular, embodiments of the present disclosure relate to methods of making cutting elements for earth-boring tools, methods of reprocessing or resurfacing cutting elements, and associated cutting elements and apparatuses.

BACKGROUND

Wellbore drilling operations may involve the use of an earth-boring tool at the end of a long string of pipe commonly referred to as a drill string. An earth-boring tool may be used for drilling through subterranean formations, such as rock, dirt, sand, tar, etc. In some cases, the earth-boring tool may be configured to drill through additional elements that may be present in a wellbore, such as cement, casings (e.g., a wellbore casing), discarded or lost equipment (e.g., fish, junk, etc.), packers, etc. In some cases, earth-boring tools may be configured to drill through plugs (e.g., fracturing plugs, bridge plugs, cement plugs, etc.). In some cases, the plugs may include slips or other types of anchors and the earth-boring tool may be configured to drill through the plug and any slip, anchor, and other component thereof.

Earth-boring tools may include cutting structures formed from abrasive materials having high hardness characteristics, such materials being commonly identified as "superhard" or "superabrasive" materials. The cutting structures may be configured to engage the formations and additional elements removing material therefrom. Imperfections in the cutting structures, and particularly in the exterior surfaces of the cutting structures used to engage subterranean formation material, may cause the cutting structures to wear at a higher rate under the stress loads and/or heat experienced by the cutting structures when engaging the formations. The higher rate of wear may lead to premature failure of the cutting structures. This may result in significant losses of time reducing the efficiency and increasing the costs of a drilling operation.

Earth-boring tools may also include additional features formed from "superhard" or "superabrasive" materials. For example, a "superhard" or "superabrasive" materials may be used to form antifriction bearings for downhole motors, anchor bits used for drilling anchor-network support holes in the coal mines; picks used for mining machines (e.g., continuous miner drums, longwall shearer drums, tunnel boring machines, shield machine foundations, rotary drilling rigs, tunneling, trenching machine drums, etc.), and chain saw cutting machine cutters used in the extraction of natural stone and decorative stone. In addition to earth-boring tools used in drilling operations, "superhard" and/or "superabrasive" materials may also be used on road plaining tools used for road surface skimming, milling and cutting tools for use on natural or reconstituted stone or cement blocks, boring tools for tunneling.

BRIEF SUMMARY

Embodiments of the disclosure may include a method of making a cutting element for use on an earth-boring tool. The method may include forming the cutting element including a cutting table formed from a polycrystalline material. The method may further include treating a cutting surface of the cutting table by pulsing a laser onto the cutting surface of the cutting table.

Other embodiments of the disclosure may include a method of reprocessing a cutting element. The method may include removing a used cutting element from an earth-boring tool. The method may further include treating a cutting surface of a cutting table of the cutting element by pulsing a laser onto the cutting surface of the cutting table.

Other embodiments of the disclosure may include a cutting element for use on an earth-boring tool. The cutting element may include a polycrystalline cutting table over a substrate. The polycrystalline cutting table may include a cutting surface. The cutting surface may be substantially free of micro-anomalies in the superabrasive material.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1:
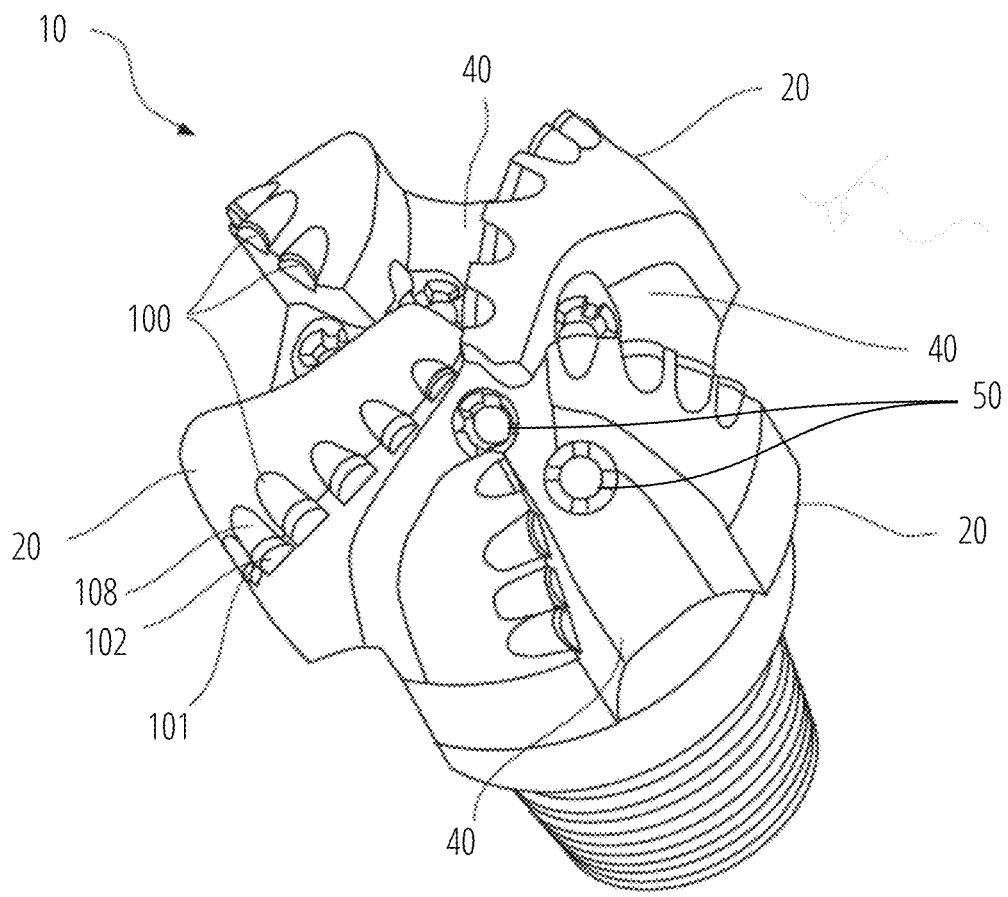
FIG. 1 illustrates a perspective view of an earth-boring tool in accordance with an embodiment of the disclosure.

The illustrations presented herein are not meant to be actual views of any particular process, earth-boring system, or component thereof, but are merely idealized representations employed to describe illustrative embodiments. The drawings are not necessarily to scale.

As used herein, the term "earth-boring tool" means and includes any type of bit or tool used for drilling during the formation or enlargement of a wellbore in a subterranean formation. For example, earth-boring tools include fixed-cutter bits, roller cone bits, percussion bits, core bits, eccentric bits, bicenter bits, reamers, mills, drag bits, hybrid bits (e.g., rolling components in combination with fixed cutting elements), and other drilling bits and tools known in the art.

As used herein, the terms "configured" and "configuration" refers to a size, a shape, a material composition, a material distribution, orientation, and arrangement of at least one feature (e.g., one or more of at least one structure, at least one material, at least one region, at least one device) facilitating use of the at least one feature in a pre-determined way.

As used herein, the term "substantially" in reference to a given parameter means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

Referring to FIG. 1, a perspective view of an earth-boring tool 10 is shown. The earth-boring tool 10 may have blades 20 in which a plurality of cutting elements 100 may be secured. The cutting elements 100 may have a cutting table 101 with a cutting surface 102, commonly termed a "cutting face," a peripheral edge of which may form the cutting edge of each of the cutting elements 100 mounted to a blade 20. The cutting elements 100 may also include a substrate 108 configured to support the cutting table 101. The substrate 108 may be secured to a cutting pocket in the blade 20, such as through soldering, brazing, adhesive bonding, threads, bolt connections, housing fixtures, etc., securing the cutting elements 100 to the blade 20.

The earth-boring tool 10 may rotate about a longitudinal axis of the earth-boring tool 10. When the earth-boring tool 10 rotates the cutting surface 102 of the cutting elements 100 may contact the earth formation and remove material. The material removed by the cutting surfaces 102 may then be removed through the junk slots 40. The earth-boring tool 10 may include nozzles 50 which may introduce fluid, such as water or drilling mud, into the area around the blades 20 to aid in removing the sheared material and other debris from the area around the blades.

Figure 2:
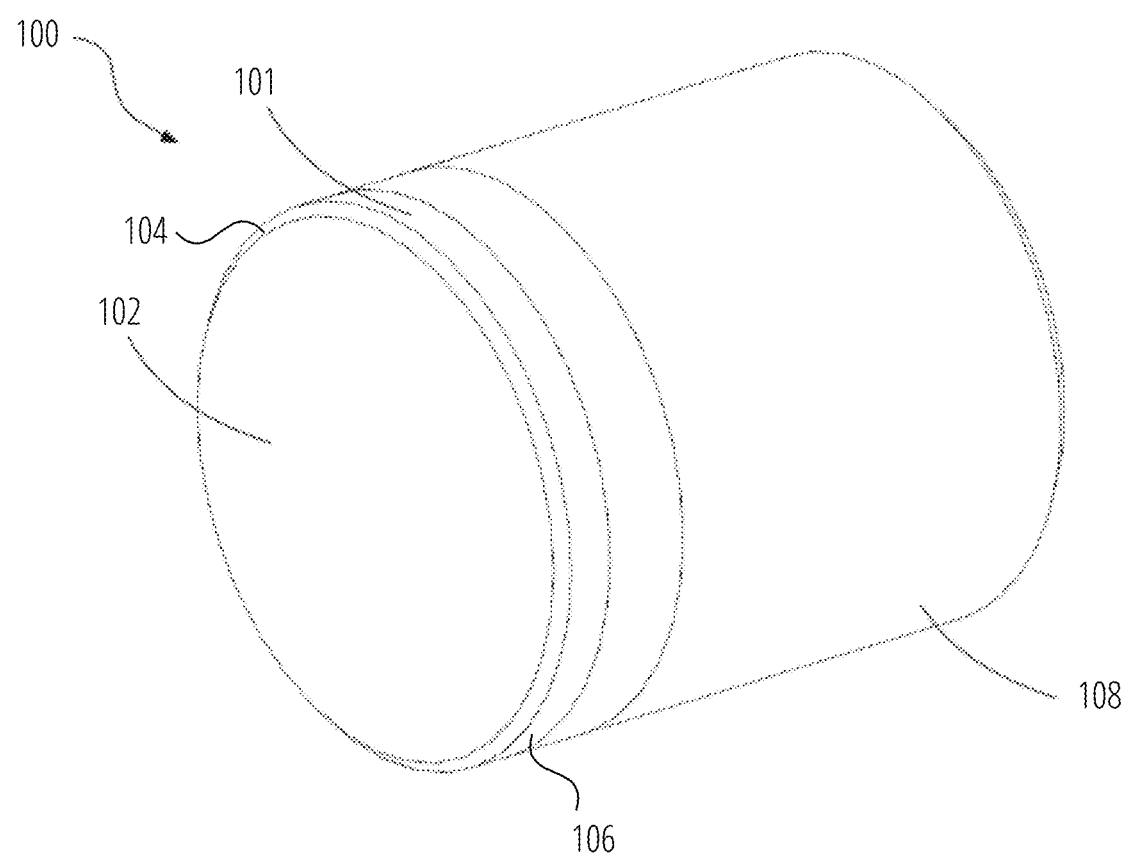
FIG. 2 illustrates a cutting element in accordance with an embodiment of the disclosure.

Referring to FIG. 2, a perspective view of an embodiment of a cutting element 100 is shown. The cutting element 100 may comprise the cutting table 101 with the cutting surface 102 and a substrate 108. The cutting table 101 may be formed from a polycrystalline material, such as, for example, polycrystalline diamond or polycrystalline cubic boron nitride. Generally, the cutting table 101 is formed of inter-bonded polycrystalline diamond in a diamond press under ultra-high pressure, high temperature conditions in the presence of a catalyst material, such as a Group VIII element (e.g., cobalt (Co), nickel (Ni), iron (Fe), etc.). Such tables are commonly referred to as "polycrystalline diamond compacts," or "PDCs." The cutting element 100 may be secured to the earth-boring tool 10 (FIG. 1) by fixing an exterior surface of the substrate 108 to the earth-boring tool 10. This is commonly achieved through a brazing process.

The cutting surface 102 may be substantially planar, as illustrated in FIG. 2. The cutting surface 102 may also include a chamfer 104 between a side surface 106 of the cutting table 101 and the cutting surface 102. In other embodiments, the cutting surface 102 may have other non-planar shapes, such as a conical shape, a chisel shape, a domed shape, other protruding shapes, patterned protrusion shapes, etc. Regardless of the shape of the cutting surface 102 of the cutting element 100, increasing a smoothness the planar surfaces and removing or eliminating defects in the surfaces of the cutting element 100 may increase the wear resistance of the cutting surface 102, which may result in improved drilling efficiency and higher durability of the associated cutting element 100. For example, minor flaws in the cutting surface 102 may create stress concentrations within the cutting table 101. The stress concentrations may result in larger cracks forming and/or superabrasive material of the cutting table 101 breaking away from the cutting table. Subsequent grinding processes may also initiate micro cracking through stress concentrations which may lead to further propagation of more pronounced intergranular or transgranular fracturing. In other cases, flaws in the cutting surface 102 may collect excess heat and/or debris, which may cause cracks and fractures in the cutting surface 102 and the cutting table 101. Thus, reducing the flaws in the cutting surface 102 may increase the life of the associated cutting element 100.

Figure 3:
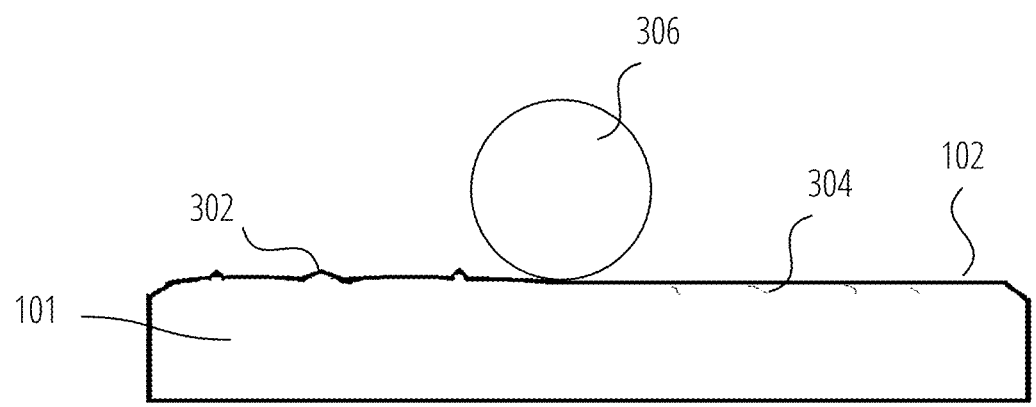
FIGS. 3-5 illustrate a schematic views of process steps for making the cutting element of FIG. 2.

FIG. 3 illustrates a process step of making a cutting element 100. After the cutting element 100 is formed, the cutting surface 102 may have a relatively rough surface 302. The rough surface 302 may be smoothed initially through a mechanical grinding process. In the mechanical grinding process, a grinder 306 may pass over the cutting surface 102. The grinder 306 may be an abrasive tool configured to remove portions of the superabrasive material of the cutting table 101. The grinder 306 may substantially remove raised portions of the cutting surface 102 until the topography of the remaining cutting surface 102 is substantially smooth. In some cases, the mechanical grinding process may involve a liquid, such as a cutting fluid or cutting oil to dissipate heat and/or remove debris from the cutting surface 102 during the mechanical grinding process. In some embodiments, the initial smoothing process may be a lapping process. In a lapping process, a rotating disc including a slurry may be used to abrade a surface of the cutting element 100. The slurry may include abrasive particles, such as diamond particles, suspended in a liquid solution, such as an oil. In other embodiments, the initial smoothing process may be a laser ablation process. In a laser ablation process, a laser having pulses in a range from about 500 nanoseconds (ns) to about 1000 microseconds (μs) may be used to remove portions of material from a surface of the cutting element 100.

In some cases, the initial smoothing process may be performed in stages. For example, coarse material removing tool, such as a lapping tool or a laser ablation tool may be utilized to removing larger, raised portions from the cutting surface 102. A second abrasive tool that is fine (e.g., less coarse), such as a mechanical polishing tool or lapping tool, may then be utilized to remove the raised portions that remain after the coarse material removing tool.

Figure 6:
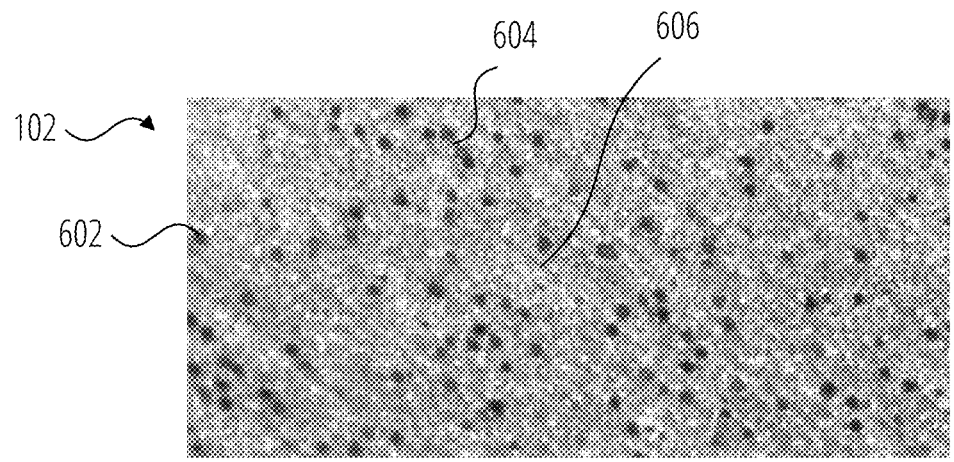
FIG. 6 illustrates a micrographic image of a cutting surface before a laser polishing process in accordance with an embodiment of the disclosure.

After the mechanical grinding process, microcracks 304 may remain in the superabrasive material (e.g., polycrystalline diamond) of the cutting surface 102. Electron microscope images of a cutting table including microcracks 304 and/or micro holes, which may be characterized as "vugs," is illustrated in FIG. 6, which is discussed in further detail below. In some cases, the microcracks 304 may be present before the mechanical grinding process. For example, some microcracks 304 may not be removed by the grinding or polishing elements used in the mechanical grinding process. In other cases, the microcracks 304 may result from heat and/or friction loads on the cutting table as a result of the mechanical grinding process. The microcracks 304 may create stress concentration regions in the cutting table 101 that may cause the cutting table 101 to wear more rapidly and result in premature failures of the associated cutting element 100.

Figure 4:
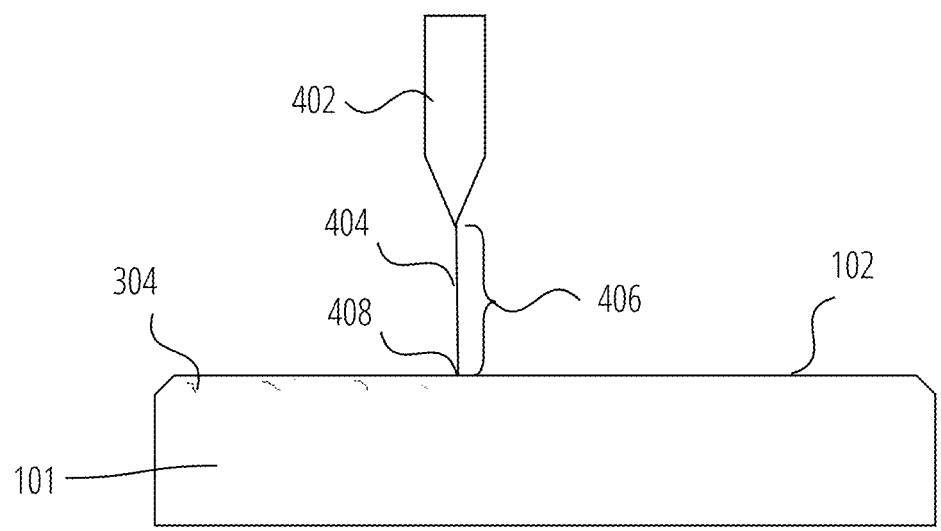

The microcracks 304 may be substantially removed from the cutting surface 102 through a laser surface treatment process as illustrated in FIG. 4. A laser 402 may be directed towards the cutting surface 102, such that the beam 404 from the laser 402 impinges on the cutting surface 102. The laser 402 may have a wavelength of between about 1 nanometer (nm) and about 2000 nm, such as between about 300 nm and about 1064 nm or between about 300 nm an about 700 nm. The beam 404 from the laser 402 may remove small amounts of superabrasive material from the cutting surface 102, which may further smooth the cutting surface 102 by removing any remaining raised portion of the cutting surface 102 as well as the microcracks 304 left behind by the mechanical grinding and/or polishing processes. The laser surface treatment process may remove a thickness of material from the cutting surface 102 equivalent to about one grain layer or less. The thickness of one grain layer may be defined by a nominal grain size of the superabrasive material. The thickness of one grain layer may be in a range from about 0.3 micrometers (μm) to about 108 μm, such as from about 10 μm to about 80 μm, about 30 μm to about 60 μm, or about 50 μm. For example, the laser surface treatment process may remove a thickness of material that is less than about 1 μm, such as less than about 0.03 μm, or less than about 0.02 μm.

The laser 402 may be positioned a distance 406 from the cutting surface 102. The distance 406 may be substantially defined by a focal length of the laser 402. The distance 406 may facilitate the beam 404 of the laser 402 to focus the energy of the laser 402 at the cutting surface 102 for efficient removal of the superabrasive material from the cutting surface 102. The distance 406 may range from about 100 mm to about 200 mm, such as from about 150 mm to about 180 mm, or from about 160 mm to about 170 mm. The cross-sectional diameter of the beam 404 at the focal point 408 may be in the range from about 20 μm to about 80 μm, such as from about 30 μm to about 60 μm, or about 40 μm.

The laser 402 may be pulsed to reduce the thermal loading of the cutting table 101 and to avoid generating electrical currents in the superabrasive material by exciting valence band electrons and causing them to cross into the conduction band. For example, the pulse duration of the laser 402 may be less than about 50 picoseconds, such as from about 1 femtosecond to about 50 picoseconds, from about 10 femtoseconds to about 12 picoseconds or from about 15 femtoseconds to about 10 picoseconds. Each laser pulse may have an energy of less than about 1 millijoule. The pulse frequency may be in a range from about 0.1 Megahertz (MHz) to about 100 MHz, such as from about 0.3 MHz to about 40 MHz. As the pulse duration of the laser 402 is reduced the amount of heat transmitted to the cutting table 101 by the beam 404 may also be reduced until substantially all of the heat transmitted to the cutting table 101 by the beam 404 from the laser 402 may remove superabrasive (i.e., diamond) material by non-thermal fracturing and vaporizing any catalyst material at the cutting surface 102, with substantially no residual heat being transmitted into underlying superabrasive material of the cutting table 101, avoiding the potential for heat-induced back-graphitization of the diamond. Similarly, the material removal rate of the beam 404 from the laser 402 may also be reduced as the pulse duration of the laser 402 is reduced.

In some embodiments, the laser polishing process may be staged similar to the mechanical grinding process. For example, the laser polishing process may begin with a stage having a higher rate of superabrasive material removal, which may be followed by a stage having a lower rate of superabrasive material removal. The rate of material removal of the laser polishing process may be determined by features of the laser 402 and/or the beam 404 of the laser 402. For example, a cross-section of the beam 404, a power of the laser 402, a pulse rate, a dwell time, etc., may all effect the rate of material removal. The later lower material removal rate stages may remove imperfections from the cutting surface 102 that were created and/or missed by the previous higher material removal rate stages. For example, a first high material removal rate stage may provide the laser 402 with an average power of between about 15 Watts (W) and about 40 W, such as between about 15 W and about 30 W or about 20 W. A second low material removal rate stage may provide the laser 402 with an average power between about 1 W and about 10 W, such as between about 3 W and about 7 W, or about 5 W. The higher removal rate stage may include fewer passes of the laser than a lower removal rate stage. For example, a higher removal rate stage may pass the beam 404 of the laser 402 over the cutting surface 102 between about 50 times and about 100 times, such as about 80 times. The lower removal rate stage may pass the beam 404 of the laser 402 over the cutting surface 102 between about 100 times and about 1000 times, such as between about 200 times and about 600 times.

Figure 5:
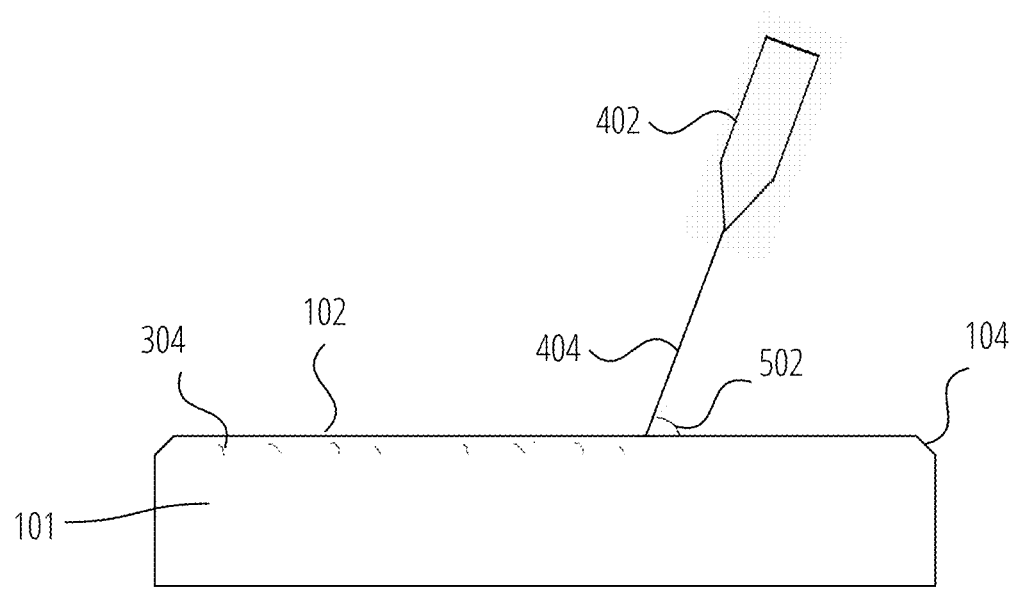

In some cases, an angle of the laser 402 with respect to the cutting surface 102 may be changed, as illustrated in FIG. 5. For example, the angle of the laser 402 may change to provide a different angle of incidence 502 of the beam 404 of the laser 402 as illustrated. In other cases, the angle of the laser 402 may change to maintain a constant angle of incidence 502. For example, if the angle of incidence 502 is about 90° across the cutting surface 102, similar to that illustrated in FIG. 4, the angle of the laser 402 may change over the chamfer 104 to maintain a substantially 90° angle of incidence 502 over the chamfer 104. Similarly, in non-planar cutting elements 100, the angle of the laser 402 may change as the beam 404 of the laser 402 passes over the cutting surface 102 to maintain a substantially constant angle of incidence 502 across the non-planar cutting surface 102.

The angle of incidence 502 may be an acute angle ranging from about 0° to about 90°, such as from about 45° to about 90°. In some cases, the angle of the laser 402 may not change during a stage of the laser polishing process. Thus, the angle of incidence 502 of the beam 404 relative to the cutting surface 102 may change if the geometry of the cutting surface 102 forms a different angle between cutting surface 102 and the laser 402, such as in the chamfer 104. Thus, if the laser 402 is positioned to have an angle of incidence 502 that is substantially 90° in the chamfer 104, the angle of incidence 502 may then be a different angle, such as 45° across the planar portion of the cutting surface 102. In another example, a laser 402 that is positioned to have an angle of incidence 502 of about 90° relative to the planar portion of the cutting surface 102 may then have an angle of incidence 502 of a different angle, such as 45° in the chamfer 104. In some cases, a stage of the laser polishing process may have multiple passes over the same area of the cutting surface 102 where each pass is accomplished at a different angle of incidence 502.

Figure 7:
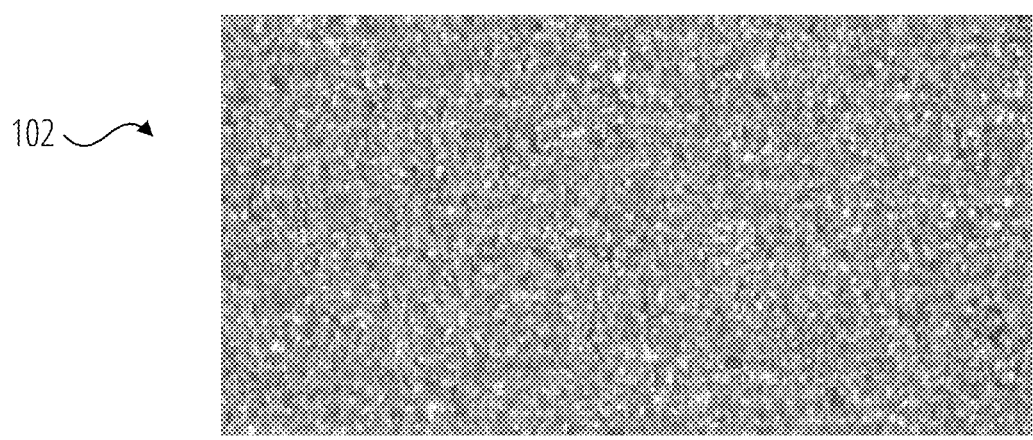
FIG. 7 illustrates a micrographic image of a cutting surface after a laser polishing process in accordance with an embodiment of the disclosure.

FIG. 6 and FIG. 7 illustrate a cutting surface 102 before (FIG. 6) and after (FIG. 7) a laser polishing process, such as the processes described above. As illustrated in FIG. 6, the cutting surface 102 may include small imperfections (e.g., micro-anomalies), such as micro holes 602, micro cracks 604, and tooling grooves 606 in the superabrasive material after the mechanical grinding process. The micro holes 602 and micro cracks 604 may have major dimensions (e.g., width, depth, diameter, etc.) that are less than about 50 μm, such as less than about 40 μm, less than about 25 μm, or less than about 100 nm. The laser polishing process may remove material from the cutting surface 102, as described above, reducing the number of imperfections, in particular the number of micro holes 602, micro cracks 604, and tooling grooves 606 as illustrated in FIG. 7. After the laser polishing process, the cutting surface 102 may feature a significant reduction in the number of micro holes 602, micro cracks 604, and tooling grooves 606, such that the cutting surface 102 may be substantially free of micro holes 602, micro cracks 604, and tooling grooves 606.

Figure 8:
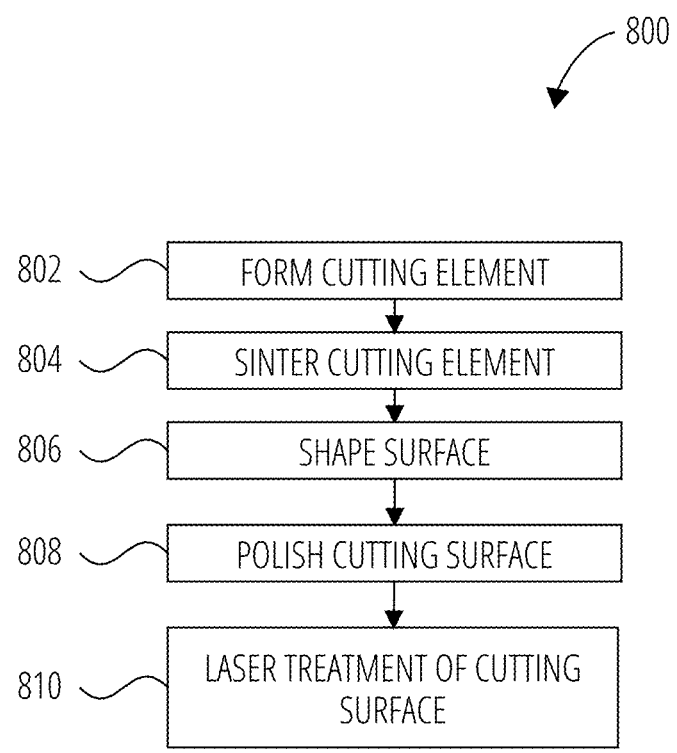
FIG. 8 illustrates a flow chart of a process of making a cutting element in accordance with an embodiment of the disclosure.

FIG. 8 illustrates a flow chart representative of a method of making a cutting element 800. First the superabrasive material (e.g., diamond particles) of the cutting element may be formed into an initial rough (i.e., green) shape in act 802. The superabrasive materials of the cutting element may be formed on a substrate in a molding process where the superabrasive materials of the cutting element may be placed in a mold adjacent a preformed substrate defining a shape of the cutting table that is roughly the same as the desired shape of the finished cutting table. As noted above, the mold with the particulate superabrasive material and substrate is then sintered in an ultra-high pressure, high temperature process 804 in the presence of a catalyst to promote inter-particle bonding and formation of the cutting table.

The molding and sintering processes may result in the cutting element having a relatively rough surface. The cutting surface of the cutting element may be shaped in act 806. The shaping process may include one or more of a mechanical grinding process, a lapping process, and a laser ablation process as described above. The shaping process may smooth and/or shape the rough surfaces of the molded and sintered cutting element by removing superabrasive material from elevated regions with an abrasive tool. As the material from the elevated regions is removed, the surface may become substantially planar, such that the differences between elevated regions and valleys in the surface topography are substantially reduced. The mechanical grinding process may also remove larger imperfections, such as ridges, cracks, pits, etc., from the cutting surface.

After the mechanical grinding process, the cutting element may go through a mechanical polishing process in act 808. The mechanical polishing process may involve an abrasive tool having a finer grit than the mechanical grinding step. The finer grit of the tool used in the mechanical polishing process may cause the polishing process to remove superabrasive material at a slower rate than the mechanical grinding process. The mechanical polishing process may remove smaller imperfections from the cutting surface including tooling grooves left behind by the grinding process. As described above, the mechanical grinding and polishing processes may not remove all of the small imperfections from the cutting surface. For example, micro-anomalies, such as micro holes, micro cracks, and tooling grooves in the superabrasive material from the mechanical polishing process may remain. Furthermore, additional micro-anomalies may be created in the superabrasive material by the mechanical grinding and polishing processes. The remaining small imperfections may be removed through a laser treatment process in act 810. Similar to the mechanical polishing process described above, the laser treatment process may remove the small imperfections left behind by the mechanical polishing process. The laser treatment process may include a laser that is pulsed as described above. Pulsing the laser may facilitate the removal of material from the cutting surface while minimizing the transfer of thermal energy to the cutting table. Minimizing the transfer of thermal energy to the cutting table, may substantially prevent material properties of the cutting table from changing due to excessive heat.

As described above, the laser treatment process of act 810 may be a staged process including multiple stages of varying superabrasive material removal rates. For example, a first stage of the laser treatment process may remove material from the cutting surface at a higher rate than a later stage of the laser treatment process. The material removal rate may be adjusted by altering the power of the laser, the pulse rate of the laser, the number of passes of the laser, the overlap of each pass of the laser, the dwell time of the laser, etc.

In some embodiments, residual catalyst material in the cutting element may be removed through a chemical process referred to as leaching. The leaching process may be performed after the sintering process of act 804 and before the laser treatment process of act 810. Thus, in some embodiments, the leaching process may be performed between sintering the cutting element in act 804 and shaping the surface of the cutting element in act 806. In other embodiments, the leaching process may be performed between shaping the surface of the cutting element in act 806 and polishing the cutting surface in act 808. In other embodiments, the leaching process may be performed between polishing the cutting surface in act 808 and the laser treatment process of act 810. In some embodiments, the leaching process may be performed after the laser treatment process of act 810. For example, the laser treatment process of act 810 may be performed on an unleached cutting element and the cutting element may go through a leaching process after the laser treatment process of act 810.

Figure 9:
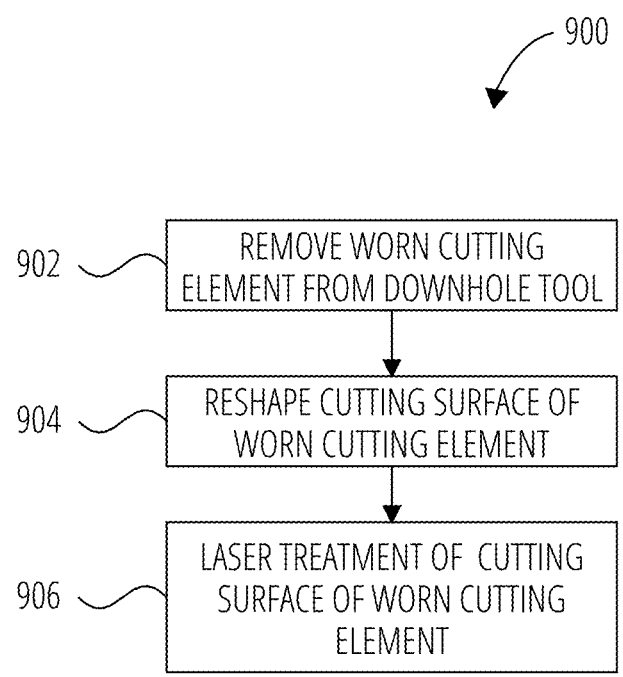
FIG. 9 illustrates a flow chart of a process of reprocessing a cutting element in accordance with an embodiment of the disclosure.

Laser treatment may also be used to reprocess used cutting elements previously deployed on an earth-boring tool. FIG. 9 illustrates a method of reprocessing a cutting element 900. The earth-boring tool may be used to engage a formation, such as by drilling a wellbore, reaming a wellbore, etc. When the earth-boring tool becomes worn or the cutting elements deployed on the earth-boring tool become worn, the earth-boring tool may be removed from the well bore for reprocessing. The worn cutting elements may be removed from the earth-boring tool in act 902. For example, a debrazing process may be used to remove the cutting elements from the earth-boring tool. If there is sufficient cutting table remaining on the cutting element the cutting element may be reprocessed. In some embodiments, the cutting elements may be processed through the following acts without removing the cutting elements from the earth-boring tool in act 902. For example, the cutting elements may be reprocessed while the cutting elements remain attached to the earth-boring tool. Thus, act 902 may be optional.

First, the cutting surface of the cutting element may be reshaped in act 904. Reshaping the cutting surface may include removing superabrasive material from the cutting surface until the cutting surface is again substantially planar or other initial shape prior to wear. The material may be removed through a mechanical grinding process and/or a mechanical polishing process as described above.

After the cutting surface is reshaped, a laser treatment process similar to those described above may be used to remove imperfections from the cutting surface in act 906. The laser treatment process may remove small imperfections that were not removed through the mechanical grinding and polishing processes as well as removing imperfections that resulted from the mechanical grinding and polishing processes. In some embodiments, such as where the cutting element experienced limited wear, the laser treatment process may be used on the cutting surface without a previous reshaping process. In such case, the laser treatment process may remove imperfections, such as impact damage and/or heat damage to the cutting surface. The laser treatment process may remove any worn portions of the cutting surface as well.

Figure 10:
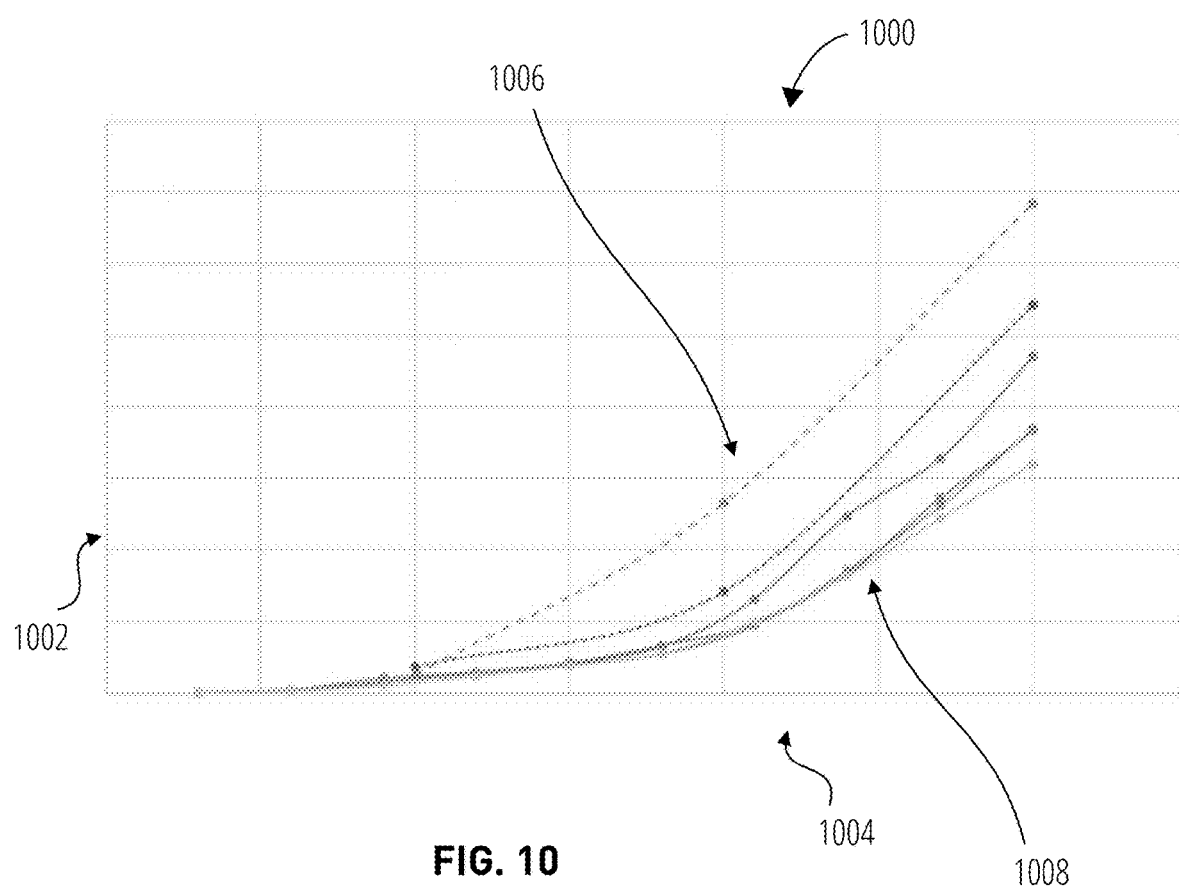
FIG. 10 illustrates a plot of experimental results of an embodiment of the disclosure.

FIG. 10 illustrates a plot 1000 of the amount of wear 1002 (e.g., wear volume or the amount of material removed from the cutting surface) exhibited by different 16 mm unleached commercially available PDC cutters 1006, 1008 respectively mechanically polished and laser treated after different, increasing numbers of passes 1004 during lab experiments. The amount of wear 1002 may be measured in cubic mils or cubic thousandths of an inch.

Each of the cutters 1006, 1008 included a chamfer on an edge of the respective cutters 1006, 1008. The chamfer of each of the cutters 1006, 1008 was about 0.016 in and extended at about a 45 degree angle to the diamond table of the respective cutter 1006, 1008. The respective cutters 1006, 1008 where coupled to a simulation tool with a backrake angle between about 5 degrees and about 30 degrees. The simulation tool was rotated at a speed of between about 50 revolutions per minute (RPM) and about 90 RPM. The simulation tool with the associated cutters 1006, 1008 was used to remove material from a granite slab. A pressure was maintained on the simulation tool to maintain a depth of cut of between about 0.005 inches and about 0.04 inches. The cutters 1006, 1008 used in the lab experiments included mechanically polished cutters 1006, the wear progression of volume of diamond removed from which is shown in broken lines, and laser treated cutters 1008, the wear progression of volume of diamond removed from which is shown in solid lines. As illustrated in the plot 1000 the mechanically polished cutters 1006 exhibited greater amounts of wear and greater variability than the laser treated cutters 1008 for the same number (i.e., 60) of passes 1004. Thus, the test results indicate that the service life of the laser treated cutters 1008 in a real-world drilling or reaming operation would be greater than the service life of the mechanically polished cutters 1006 in the same subterranean environment. Furthermore, the wear experienced by the laser treated cutters 1008 was more consistent throughout the experiment, with each of the laser treated cutters 1008 exhibiting substantially the same the amount of wear at each logged number of passes 1004. The consistency of the wear may result in higher predictability of the wear. Increasing the predictability of the wear of the cutting elements may result improved wellbore planning, improved prediction models, etc., all of which may result in increased efficiency of an associated drilling operation.

Embodiments of the disclosure may facilitate the removal of small imperfections, such as micro-anomalies in the superabrasive material, that are not removed through mechanical grinding and polishing processes from the cutting surface of a cutting element. The removal of the small imperfections may increase the service life of the associated cutting element. The removal of small imperfections may also reduce cutting loads on the associated cutting elements, which may further contribute to increasing the service life of the associated cutting element. Increasing the service life of a cutting element may increase the amount of time that an associated earth-boring tool may be used before tripping the earth-boring tool and associated drill string out of the borehole. Tripping a drill string and earth-boring tool out of a borehole can take a significant amount of time and represents a loss of both time and productivity for the associated drilling operation. Thus, extending the time that an earth-boring tool can be used before tripping the drill string and earth-boring tool may increase the efficiency and productivity of the associated earth-boring operation.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A method of making a cutting element for use on an earth-boring tool, the method comprising:
   forming the cutting element including a cutting table formed from a superabrasive polycrystalline material in the presence of a catalyst;
   grinding a cutting surface of the cutting table to substantially remove raised portions of the cutting surface of the cutting table;
   polishing the cutting surface of the cutting table until the cutting surface of the cutting table is substantially smooth; and
   treating the cutting surface of the cutting table by non-thermal fracturing through pulsing a laser onto the cutting surface of the cutting table and vaporizing the catalyst remaining on the cutting surface after the grinding of the cutting surface of the cutting table and polishing the cutting surface of the cutting table;

wherein each pulse of the laser has an energy less than about 1 millijoule and the laser is focused to have a cross-sectional diameter between about 20 μm and about 100 μm.

2. The method of claim 1, further comprising leaching the cutting element before treating the cutting surface of the cutting table.

3. The method of claim 1, further comprising leaching the cutting element after treating the cutting surface of the cutting table.

4. The method of claim 1, further comprising treating the cutting surface with the laser in at least two stages, wherein a first stage comprises removing superabrasive material at a first material removal rate with the laser and a second stage comprises removing superabrasive material at a second lower material removal rate.

5. The method of claim 4, wherein removing superabrasive material at the second lower material removal rate comprises pulsing the laser at a second power that is less than a first power used for the first material removal rate.

6. The method of claim 5, further comprising generating the first power between 15 W and 40 W and generating the second power between 1 W and 10 W.

7. The method of claim 5, wherein the second stage comprises removing one or more grain layers of material from the cutting surface by passing the laser in a scanning pattern over the cutting surface a plurality of times.

8. The method of claim 1, further comprising orienting a beam from the laser and a target portion of the cutting surface at an angle of incidence between 0° and 90°.

9. The method of claim 1, wherein pulsing the laser comprises pulsing the laser at a frequency between 0.1 Megahertz (MHz) and 100 MHz.

10. The method of claim 1, wherein treating the cutting surface by pulsing the laser comprises removing one grain layer or less of superabrasive material from the cutting surface.

11. A method of reprocessing a cutting element, the method comprising:

removing a used cutting element from an earth-boring tool, the cutting element being formed from a superabrasive polycrystalline material in the presence of a catalyst;

grinding a cutting surface of the cutting table to substantially remove raised portions of the cutting surface of the cutting table;

polishing the cutting surface of the cutting table until the cutting surface of the cutting table is substantially smooth; and treating the cutting surface of the polycrystalline superabrasive cutting table of the cutting element by non-thermal fracturing through pulsing a laser onto the cutting surface of the cutting table and vaporizing the catalyst remaining on the cutting surface after the grinding of the cutting surface of the cutting table and polishing the cutting surface of the cutting table;

wherein the laser is focused to have a cross-sectional diameter between about 20 μm and about 100 μm.

12. The method of claim 11, further comprising reshaping the cutting surface of the cutting table removing a worn portion of the cutting table of the used cutting element by grinding the cutting table of the cutting element to reform the cutting surface to an initial unworn shape.

13. The method of claim 11, wherein pulsing the laser comprises pulsing the laser with a pulse duration between 200 nanoseconds and 10 femtoseconds.

14. The method of claim 11, further comprising polishing the cutting surface by pulsing the laser in multiple stages, wherein a first stage removes superabrasive material from the cutting surface at a first material removal rate and a second later stage removes superabrasive material from the cutting surface at a second lower material removal rate.

15. The method of claim 14, further comprising changing at least one of a power of the laser, a pulse rate of the laser, a number of passes of the laser, an overlap of each pass of the laser, a dwell time of the laser, and a cross-section of a beam of the laser after the first stage to achieve the second lower material removal rate.

16. The method of claim 11, wherein polishing the cutting surface by pulsing the laser comprises removing between 0.1 μm and 60 μm of material from the cutting surface.

17. A cutting element for use on an earth-boring tool, the cutting element comprising:

a polycrystalline cutting table over a substrate;

the polycrystalline cutting table comprising a cutting surface, the cutting surface being substantially free of a catalyst, the cutting surface formed by:

polishing the cutting surface of the cutting table until the cutting surface of the cutting table is substantially smooth; and treating the cutting surface of the cutting table by non-thermal fracturing through pulsing a laser onto the cutting surface of the cutting table and vaporizing the catalyst remaining on the cutting surface after the polishing of the cutting surface of the cutting table.

18. The cutting element of claim 17, the cutting table further comprising a chamfer between a side surface of the cutting table and the cutting surface.

\* \* \* \* \*